US011425034B1

(12) United States Patent
Boopathy et al.

(10) Patent No.: US 11,425,034 B1
(45) Date of Patent: Aug. 23, 2022

(54) DETERMINING SHIELDED BACKUP PATHS

(71) Applicant: Juniper Networks, Inc., Sunnyvale, CA (US)

(72) Inventors: Hariharan Boopathy, Bangalore (IN); Vinod Kumar N, Bangalore (IN); Ravi M R, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 17/301,272

(22) Filed: Mar. 30, 2021

(51) Int. Cl.
| H04L 45/28 | (2022.01) |
| H04L 45/00 | (2022.01) |
| H04L 43/0823 | (2022.01) |
| H04L 43/0817 | (2022.01) |
| H04L 45/42 | (2022.01) |

(52) U.S. Cl.
CPC .......... *H04L 45/28* (2013.01); *H04L 43/0817* (2013.01); *H04L 43/0823* (2013.01); *H04L 45/22* (2013.01); *H04L 45/42* (2013.01)

(58) Field of Classification Search
CPC ..... H04L 45/28; H04L 45/00; H04L 43/0823; H04L 43/0817; H04L 45/42
See application file for complete search history.

(56) References Cited

U.S. PATENT DOCUMENTS

| 10,581,736 B1* | 3/2020 | Choudhury | ........ H04Q 11/0062 |
| 2010/0157789 A1* | 6/2010 | Bakshi | .................... H04L 45/00 370/216 |
| 2011/0007629 A1 | 1/2011 | Atlas et al. | |
| 2013/0114402 A1* | 5/2013 | Ould-Brahim | ...... H04L 43/0811 370/242 |
| 2013/0286822 A1 | 10/2013 | Liu et al. | |
| 2015/0016242 A1* | 1/2015 | Ernstrom | ................ H04L 45/48 370/218 |
| 2015/0117860 A1* | 4/2015 | Braun | .................... H04B 10/27 398/58 |
| 2016/0191194 A1* | 6/2016 | Wood | .................. H04L 41/0896 398/58 |

(Continued)

OTHER PUBLICATIONS

Extended Search Report from counterpart European Application No. 21180957.9 dated Dec. 17, 2021, 14 pp.

*Primary Examiner* — Philip J Chea
*Assistant Examiner* — Mohammed Ahmed
(74) *Attorney, Agent, or Firm* — Shumaker & Sieffert, P.A.

(57) ABSTRACT

An example network device includes a memory; and processing circuitry configured to: determine a primary path between the network device and a second network device; determine candidate backup paths between the network device and the second network device; in response to a determination that a first candidate backup path of the candidate backup paths satisfies a first priority criteria, select the first candidate backup path as a backup path; in response to a determination that a second candidate backup path of the candidate backup paths satisfies a second priority criteria, select the second candidate backup path as the backup path; and program a packet processor of the network device with the primary path and the backup path. The first priority criteria and the second priority criteria can be based on a risk of simultaneous failure of the primary path and a candidate backup path of the plurality of backup path.

18 Claims, 7 Drawing Sheets

(56) References Cited

U.S. PATENT DOCUMENTS

| | | | |
|---|---|---|---|
| 2016/0191370 A1* | 6/2016 | Wood | H04L 41/0816 |
| | | | 370/238 |
| 2019/0319877 A1* | 10/2019 | Matsushita | H04L 45/28 |
| 2021/0111944 A1* | 4/2021 | Kuwabara | H04L 41/0654 |
| 2021/0111990 A1* | 4/2021 | Nainar | H04L 45/22 |
| 2021/0119903 A1* | 4/2021 | Skalecki | H04L 45/123 |
| 2021/0143904 A1* | 5/2021 | Rao | G06F 16/22 |
| 2021/0258243 A1* | 8/2021 | Narasimhan | H04L 45/28 |

* cited by examiner

```
regress@r0# run show isis interface detail
IS-IS interface database:
lo0.0
Index: 322, State: 0x6, Circuit id: 0x1, Circuit type: 2
LSP interval: 100 ms, CSNP interval: disabled
Adjacency advertisement: Advertise, Layer2-map: Disabled
Level Adjacencies Priority Metric Hello (s) Hold (s) Designated Router
  2      0      64       0 Passive xe-0/0/0:0.0
Index: 333, State: 0x6, Circuit id: 0x1, Circuit type: 2
LSP interval: 100 ms, CSNP interval: 10 s
Adjacency advertisement: Advertise, Layer2-map: Disabled
Protection Type: Link () [enhanced protection – LC level]
Level Adjacencies Priority Metric Hello (s) Hold (s) Designated Router
  2      1      64      10   9.000    27 xe-1/0/0:1.0
Index: 334, State: 0x6, Circuit id: 0x1, Circuit type: 2
LSP interval: 100 ms, CSNP interval : 10 s
Adjacency advertisement: Advertise, Layer2-map: Disabled
Level Adjacencies Priority Metric Hello (s) Hold (s) Designated Router
  2      1      64      63   9.000    27
```

FIG. 5

```
regress@r0# run show pim join extensive
Instance: PIM.master Family: INET
R = Rendezvous Point Tree, S = Sparse, W = Wildcard Group: 232.0.0.1
        Source: 192.168.0.1
        Flags: sparse,spt
        Active upstream interface: xe-0/0/0 :0.0
        Active upstream neighbor: 10.1.0.1
        MoFRR Backup upstream interface: xe-1/0/0:1.0 [enhanced protection - LC level]
        MoFRR Backup upstream neighbor: 10.2.0.1
        Upstream state: Join to Source
        Keepalive timeout:
        Uptime: 00:06:46
        Downstream neighbors:
                Interface: Pseudo-GMP
                        xe-0/0/0:2.0
        Number of downstream interfaces: 1
        Number of downstream neighbors: 0
```

FIG. 6

DETERMINING SHIELDED BACKUP PATHS

TECHNICAL FIELD

The disclosure relates to computer networks and, more particularly, to determining backup paths between routers in computer networks.

BACKGROUND

A computer network is a collection of interconnected computing devices that can exchange data and share resources. Example network devices include layer two devices that operate within the second layer of the Open Systems Interconnection (OSI) reference model, i.e., the data link layer, and layer three devices that operate within the third layer of the OSI reference model, i.e., the network layer. Network devices within computer networks often include a control unit that provides control plane functionality for the network device and forwarding components for routing or switching data units. In some cases, for example, a network device may include a one or more line cards, one or more packet processors, and one or more ports coupled to a switch fabric that collectively can provide a forwarding plane for forwarding network traffic.

The control plane functions provided by the control unit include storing network topologies in the form of a routing information base (RIB), executing routing protocols to communicate with peer routing devices to maintain and update the RIB, and providing a management interface to allow user access and configuration of the network device. The control unit maintains routing information that represents the overall topology of the network and defines routes to destinations within the network.

The control unit derives a forwarding information base (FIB) that includes a number of forwarding entries generated by the control unit in accordance with the routing information and control information. The control unit installs the forwarding structures within the data plane to programmatically configure the forwarding components. The data and instructions that constitute the forwarding entries define an internal forwarding path for each incoming packet received by the network device. For example, to generate a route table lookup forwarding entry, the control unit selects routes defined by the network topology and maps packet key information (e.g., destination information and other select information from a packet header) to one or more specific next hop network devices and ultimately to one or more specific output interfaces of interface cards of the network device. In some cases, the control unit may install the forwarding structures into each of the packet processors to update the forwarding table within each of the packet processors and control traffic forwarding within the data plane. Bifurcating control and data plane functionality allows the forwarding table in each of packet processors to be updated without degrading packet forwarding performance of the network device.

SUMMARY

In general, the disclosure describes techniques to determine backup paths from a first network device to a second network device that reduce the risk of failure in network traffic communication between the first network device and the second network device. A routing protocol process (e.g., a routing protocol daemon (RPD)) of the first network device can determine a primary path and multiple backup paths between the first network device and the second network device. The backup paths include network device components involved in forwarding packets through the first network device. Examples of such components include line cards, packet processors, and ports. A path between the first network device and the second network device typically includes line card, a packet processor, and a port coupling the line card to a network medium. The RPD can assign a priority to the backup paths based on which, if any, network device components in the primary path are also result in a backup path. In the event of a failure of the primary path, the RPD can reconfigure the network device to use the highest priority backup path.

An example method includes determining, by processing circuitry of a first network device, a primary path between the first network device and a second network device; determining, by the processing circuitry, a plurality of candidate backup paths between the first network device and the second network device; determining, by the processing circuitry, whether a first candidate backup path of the plurality of candidate backup paths satisfies a first priority criteria; in response to determining that the first candidate backup path satisfies the first priority criteria, selecting the first candidate backup path as a backup path for the primary path; in response to determining that the first candidate backup path does not satisfy the first priority criteria, determining whether a second candidate backup path of the plurality of candidate backup paths satisfies a second priority criteria, wherein the first priority criteria and the second priority criteria are based, at least in part, on corresponding risks of simultaneous failure of the primary path and a candidate backup path of the plurality of backup paths, in response to determining that the second candidate backup path of the plurality of candidate backup paths satisfies the second priority criteria, selecting the second candidate backup path as the backup path for the primary path instead of the first candidate backup path; and programming one or more packet processors of the first network device with either or both the primary path and the backup path.

An example network device includes a memory; and processing circuitry configured to: determine a primary path between the first network device and a second network device; determine a plurality of candidate backup paths between the first network device and the second network device; determine whether a first candidate backup path of the plurality of candidate backup paths satisfies a first priority criteria; in response to a determination that the first candidate backup path of the plurality of candidate backup paths satisfies the first priority criteria, select the first candidate backup path as a backup path; in response to a determination that the first candidate backup path does not satisfy the first priority criteria, determine whether a second candidate backup path of the plurality of candidate backup paths satisfies a second priority criteria, wherein the first priority criteria and the second priority criteria are based, at least in part, on corresponding risks of simultaneous failure of the primary path and a candidate backup path of the plurality of backup paths, in response to a determination that the second candidate backup path of the plurality of candidate backup paths satisfies the second priority criteria, select the second candidate backup path as the backup path instead of the first candidate backup path; and program one or more packet processors of the first network device with either or both the primary path and the backup path.

An example computer readable medium includes instructions that, when executed, cause processing circuitry of a first network device to: determine a primary path between the first network device and a second network device; determine a plurality of candidate backup paths between the first network device and the second network device; determine whether a first candidate backup path of the plurality of candidate backup paths satisfies a first priority criteria; in response to a determination that the first candidate backup path of the plurality of candidate backup paths satisfies the first priority criteria, select the first candidate backup path as a backup path; in response to a determination that the first candidate backup path does not satisfy the first priority criteria, determine whether a second candidate backup path of the plurality of candidate backup paths satisfies a second priority criteria, in response to a determination that the second candidate backup path of the plurality of candidate backup paths satisfies the second priority criteria, select the second candidate backup path as the backup path instead of the first candidate backup path, in response to a determination that the second candidate backup path of the plurality of candidate backup paths does not satisfy the second priority criteria, determine whether a third candidate backup path of the plurality of candidate backup paths satisfies a third priority criteria, in response to a determination that the third candidate backup path satisfies the third priority criteria, select the third candidate backup path as the backup path, wherein the first priority criteria, second priority criteria and the third priority criteria are based, at least in part, on corresponding risks of simultaneous failure of the primary path and a candidate backup path of the plurality of backup paths; and program one or more packet processors of the first network device with either or both the primary path and the backup path.

The details of one or more examples are set forth in the accompanying drawings and the description below. Other features, objects, and advantages will be apparent from the description and drawings, and from the claims.

BRIEF DESCRIPTION OF DRAWINGS

FIG. 5 is a conceptual view of an example user interface output for a network device having an IS-IS LFA interface with a backup path determined according to the techniques described herein.

FIG. 6 is a conceptual view of an example user interface output for a network device having PIM MoFRR interface with a backup path determined according to the techniques described herein.

DETAILED DESCRIPTION

Figure 1:
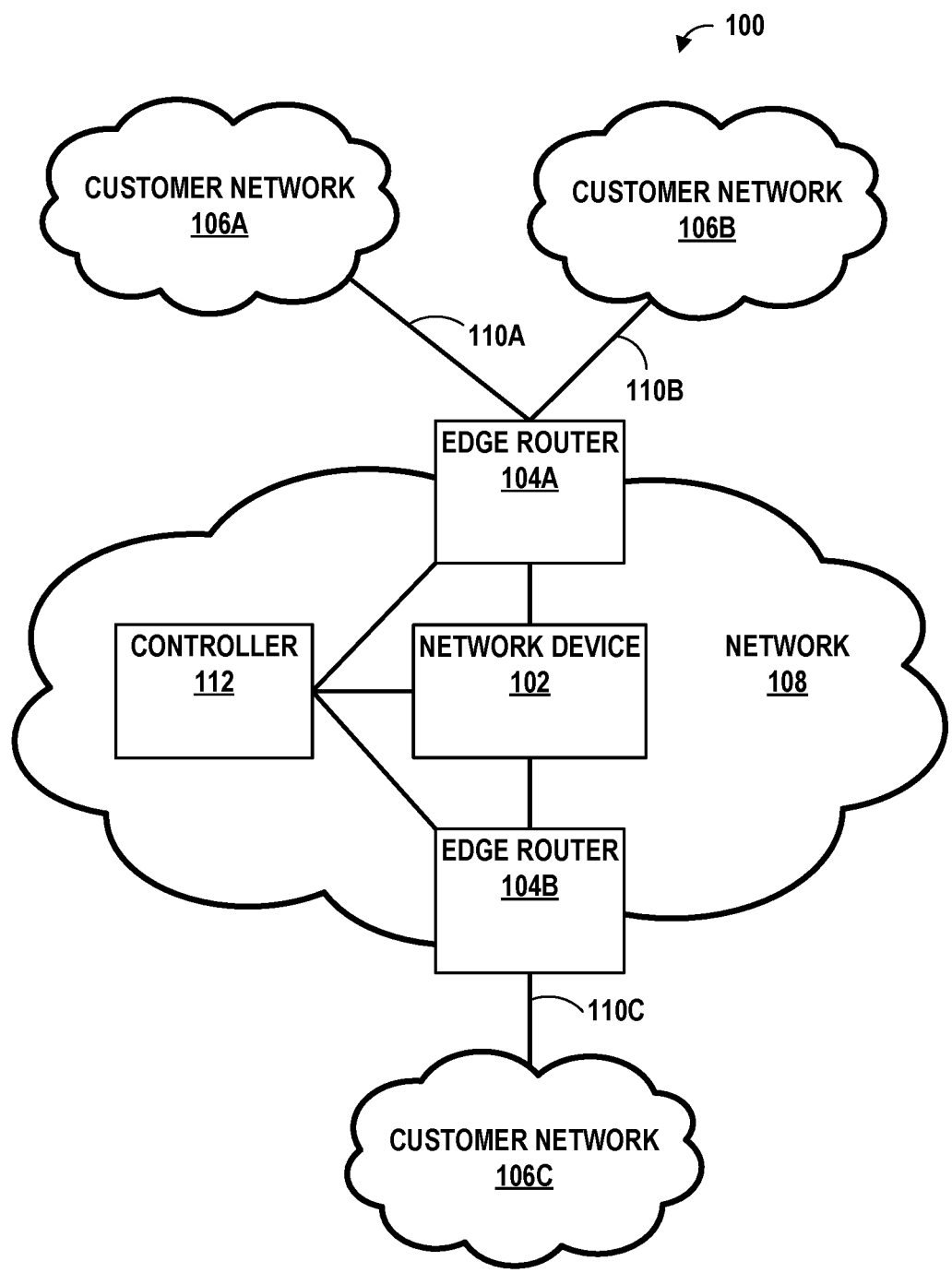
FIG. 1 illustrates a system with network devices operating in accordance with the techniques described in this disclosure.

Techniques described herein determine one or more backup paths for a primary path from a network device to another network device. A routing protocol process (e.g., RPD) of the network device can determine a primary path and multiple backup paths between the first network device and the second network device. The primary path and backup paths include network device components internal to the network device that are involved in forwarding packets through the network device. For example, a path between the network device and the other network device typically includes a line card, a packet processor, and a port coupling the line card to a network medium. As noted above, the RPD can assign a priority to the backup paths based on which, if any, network device components in the primary path are also result in a backup path. In the event of a failure of the primary path, the network device can implement a local repair mechanism that reconfigures the network device to use the highest priority backup path.

As an example, a network device may determine a primary path that includes a line card, a packet processor, and a port, where the line card, packet processor and port can be in what will be referred to as a failure hierarchy. In such a hierarchy, a network device component failure at one level of the hierarchy results in the failure in the ability of network component devices lower in the hierarchy to be able to transmit network packets. For example, a line card may include one or more packet processors, such as packet forwarding engines (PFEs). The packet processor may process network packets for transmission through a port on the line card. In this example, the line card is at the highest level of the hierarchy, the packet processor is at a middle level of the hierarchy, and the port is at the lowest level of the hierarchy. A failure of the line card results in failure of any packet processors and any ports associated with those packet engines to be able to transmit network packets. A failure in the packet processor results in failure of any ports associated with the packet engine to transmit network packets. However, other packet processors on the line card may still be functional and may be able to transmit packets through their associated ports. A failure in a port affects only the port. Other ports associated with the packet processor may still be able to transmit network packets, and ports associated with other packet processors may still be able to transmit network packets.

Thus, a backup path that shares a line card with the primary path will likely fail when the shared line card fails, but will not fail if the backup path uses a different line card. A backup path that shares a packet processor will likely fail when the shared packet processor fails, but will not necessarily fail if it uses a different packet processor on the same line card. A backup path that shares a port will likely fail if the port fails, but will not necessarily fail if assigned a different port, even if the different port is associated with the same packet engine.

According to the techniques described herein, backup paths are selected in a priority that favors paths that do not share network device components, or if shared, do so at a lower level in the hierarchy. In the event of a failure in the primary path, the backup path having the highest priority is selected to replace the primary path. This highest priority backup path is less likely to share any network device components, or, if it does share network device components, does so at a low level in the failure hierarchy.

Current network devices typically do not take the risk of failure associated with shared network device components into account when determining backup paths for a primary path. Instead, current systems typically select a "next best" path as a backup path. However, the next best path may share network device components with the primary path such that a failure in the primary path may also result in a failure in the backup path. The techniques described herein can provide technical advantages over such current systems. For example, a current network device may utilize heuristics to determine a "best path" to a network destination. Additionally, the network device may utilize the same or similar heuristics to determine a "next best" path as a backup path. The primary path and the backup path can be programmed into a packet processor. However, the heuristics used by the current network device may compute a primary path and the backup path that utilize the same packet processor. In the event of a failure in the packet processor used in the primary path, the network device will attempt to use the backup path regardless of whether it is on the same packet processor as the primary path. Because both the primary path and the backup path share the failed packet processor, there may be no available path currently computed for the network destination. As a result, the current network device must recompute the primary path and backup path, which can take an undesirable amount of time and further result in lost packets. Thus, the purpose of having a predefined backup path can be defeated if the backup path shares a packet processor or line card with the primary path and the shared resource fails.

The techniques described herein prioritize selection of backup paths that do not share network device components, or share network device components at a lower level in the above-described failure hierarchy. As a result, a failure of a network device component in the primary path is less likely to be the cause of failure in a backup path. This can result dropping fewer network packets, thus improving network device performance. Further, recovery from a failure in the primary backup path may be quicker because the network device may not need to try multiple backup paths in order to reestablish communications with another network device, further improving network device performance.

FIG. 1 is a block diagram illustrating an example network environment in which a network includes a network device configured in accordance with techniques described in this disclosure. For purposes of example, the principles of the invention are described with respect to a simplified network environment 100 of FIG. 1 in which a network device 102 (sometimes referred to as a "core router") communicates with edge routers 104A and 104B (collectively "edge routers 104") to provide customer networks 106A-106C (collectively "customer networks 106") with access to network 108. Network 108 may be, for example, a service provider network or a cloud computing network.

Although not illustrated, the network 108 may be coupled to one or more networks administered by other providers, and may thus form part of a large-scale public network infrastructure, e.g., the Internet. Consequently, the customer networks 106 may be viewed as edge networks of the Internet. The network 108 may provide computing devices within the customer networks 106 with access to the Internet, and may allow the computing devices within the customer networks 106 to communicate with each other. In another example, the service provider network 108 may provide network services within the core of the Internet. As another example, the network 108 may provide services (e.g., cloud computing services, etc.) to the computing devices with the customer networks 106. In either case, the network 108 may include a variety of network devices (not shown) other than the router 102 and the edge routers 104, such as additional routers, switches, servers, or other devices.

In the illustrated example, the edge router 104A is coupled to the customer network 106A via access link 110A, and the edge router 104B is coupled to the customer networks 106B and 106C via additional access links 110B and 110C. The customer networks 106 may be networks for geographically separated sites of an enterprise. The customer networks 106 may include one or more computing devices (not shown), such as personal computers, laptop computers, handheld computers, workstations, servers, switches, printers, customer data centers or other devices. The configuration of the network environment 100 illustrated in FIG. 1 is merely an example. The service provider network 108 may be coupled to any number of the customer networks 106. Nonetheless, for ease of description, only an example number of customer networks 106A-106C are illustrated in FIG. 1. Many different types of networks beside networks 108 may employ an instance of the router 102, including customer/enterprise networks, transport networks, aggregation or access networks, and so forth. Network traffic may flow, for example, from one customer network 106A to another customer network 106C through network device 102.

Network device 102 may communicate with other network devices (e.g., other core routers, switches etc.) for communications within network 108 in addition to communicating with edge routers 104. The network device 102 may exchange routing information with the edge routers 104 and/or controller 112 in order to maintain an accurate representation of the topology of the network environment 100. As described below, the network device 102 may consist of a plurality of cooperative routing components operating as a single node within the service provider network 108. The network device 102 includes a chassis (not shown in FIG. 1) that couples various internal routing components such as line cards, switching fabric cards, packet processors, routing engine cards, etc. together. A line card may be a flexible physical interface card (PIC) concentrator (FPC), dense port concentrators (DPCs), and modular port concentrators (MPCs). Network device 102 may determine internal paths to edge routers 104 and other core routers that utilize these internal routing components. A routing protocol process, e.g., daemon (RPD) on network device 102 may determine a line card, packet processor and a port as a primary path of internal routing components to use when forwarding network packets to a next hop (e.g., another core router or edge router 104). In some aspects, the RPD may use various heuristics to determine a "best path" as the primary path. The RPD can also use the techniques described herein to determine a backup path.

One of the internal routing components of a primary path through network device 102 may, from time to time, fail (i.e., become unavailable to process and forward network traffic through network device 102 to the next hop). In this case, the network device may begin to use the backup path for forwarding network packets to the next hop.

In the illustrated example, service provider network 108 includes a controller 112. In some examples, controller 112 may comprises software-defined networking controller. Controller 112 may monitor service provider network 108 and provide an interface for administrators to configure and/or monitor devices within service provider network 108 (e.g., network device 102, edge routers 104, etc.). In some examples, controller 112 may perform diagnostic functions and display health of network 108 in a graphical user interface to facilitate maintenance of network 108. In other examples, controller 112 may advertise the topology of network 108 and/or perform path computation based on the topology of network 108 and advertise routing updates to the devices within network 108.

Figure 2:
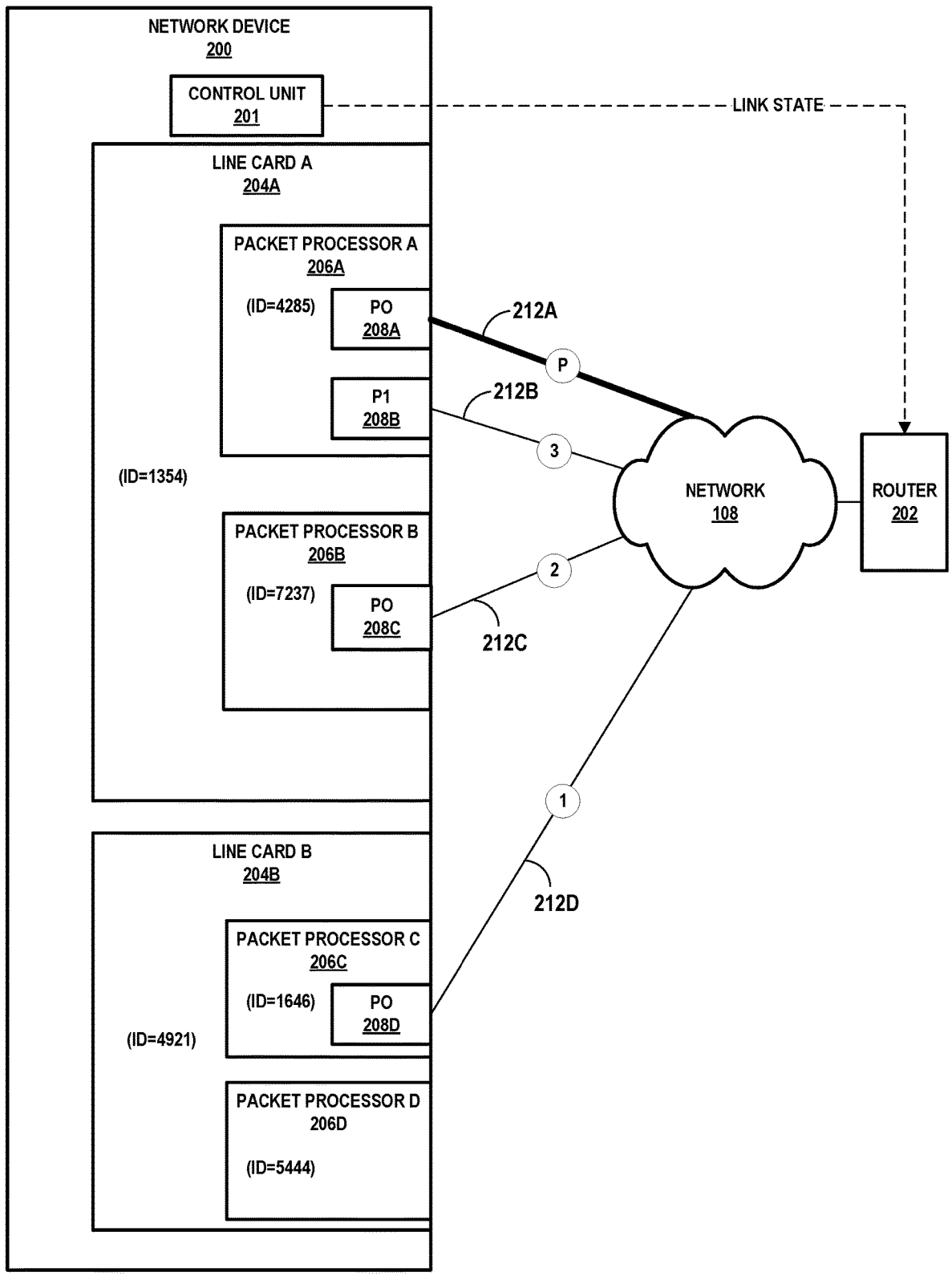
FIG. 2 is a block diagram illustrating an example network device that determines backup paths in accordance with techniques described in this disclosure.

FIG. 2 is a block diagram illustrating an example network device that determines backup paths in accordance with principles described in this disclosure. In this example, network device 200 includes a control unit 201 that provides control plane functionality for the device. Network device 200 can be an example of network device 102 and edge routers 104. In the example illustrated in FIG. 2, network device 200 includes line card A 204A and line card B 204B (generically referred to as "line card 204"). Line card 204A and line card 204B each include two forwarding components in the form of example packet processors 206A-206B and packet processors 206C-202D respectively (collectively referred to as "packet processors 206"). Packet processors 206 receive and send data packets via associated ports 208A-208D of line cards 204A and 204B. Each of ports 208A-208D can be associated with a respective one of packet processors 206. Each of packet processors 206 and its associated ports 208 may reside on a separate line card for network device 200. As noted above, line cards 204 may be PICs, FPCs, DPCs, MPCs, or other types of forwarding units. Each of ports 208 may include interfaces for various combinations of layer two (L2) technologies, including Ethernet, Gigabit Ethernet (GigE), and Synchronous Optical Networking (SONET) interfaces. The number of line cards 204, packet processors 206 and ports 208 for network device 200 shown in FIG. 2 is merely an example. A network device can have a greater or lesser number of line cards 204, packet processors 206 and ports 208 than that shown in FIG. 2.

Packet processors 206 process packets by performing a series of operations on each packet over respective internal packet forwarding paths as the packets traverse the internal architecture of network device 200. Packet processors 206 can include hardware and/or software packet processors that examine the contents of each packet (or another packet property, e.g., incoming interface) to make forwarding decisions, apply filters, and/or perform accounting, management, traffic analysis, and/or load balancing. The result of packet processing determines the manner in which a packet is forwarded or otherwise processed by packet processors 206 to an associated port 208.

Control unit 201 can be connected to each of packet processors 206 by internal communication link (not shown in FIG. 2). The internal communication link may comprise a 100 Mbps Ethernet connection, for instance. Control unit 201 may include one or more processors (not shown in FIG. 2) that execute software instructions, such as those used to define a software or computer program, stored to a computer-readable storage medium (again, not shown in FIG. 2), such as non-transitory computer-readable mediums including a storage device (e.g., a disk drive, or an optical drive) and/or a memory such as random-access memory (RAM) (including various forms of dynamic RAM (DRAM), e.g., DDR2 SDRAM, or static RAM (SRAM)), Flash memory, another form of fixed or removable storage medium that can be used to carry or store desired program code and program data in the form of instructions or data structures and that can be accessed by a processor, or any other type of volatile or non-volatile memory that stores instructions to cause the one or more processors to perform techniques described herein. Alternatively, or in addition, control unit 201 may include dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Control unit 201 may include a routing protocol daemon (RPD). The RPD can determine a line card, packet processor and a port as a primary path of internal routing components to use when forwarding network packets to a next hop (e.g., another core router or edge router 104). In some aspects, the RPD may use various heuristics to determine a "best path" as the primary path. This primary may be programmed into a packet processor, for example in a forwarding table used by the packet processor. The RPD can use the techniques described herein to determine a backup path that has a relatively low risk of failure should there be a failure in the primary path. For example, one of the internal routing components of a primary path through network device 102 may, from time to time, fail (i.e., become unavailable to process and forward network traffic through network device 102 to the next hop). The packet processor can utilize the backup path to forward packets to the next hop.

In the example illustrated in FIG. 2, an RPD of network device 102 has used known techniques to select path 212A as the primary path through to reach router 202 via network 108. Path 212A includes line card 204A, packet processor 206A and port P0 208A. Additionally, the RPD has determined three candidate backup paths 212B-212D. A candidate backup path may have a priority assigned to it based on whether or not the candidate backup path meets the selection criteria for the priority. In some aspects, there can be three priorities, each with their own selection criteria. The three priorities are associated with a risk that the candidate backup path will also fail should the primary path fail. A first priority has a selection criteria that specifies that the primary path and the candidate backup path may both fail only if the network device itself fails. A second priority has a selection criteria that the primary path and the candidate backup path may both fail if the primary path and candidate backup path share a line card that fails. A third priority has a selection criteria that the primary path and candidate backup path may both fail if the primary path and the backup path share a packet processor that fails. The priorities can be ordered based on the risk that both the primary path and candidate backup path fail. For example, the first priority is associated with the relatively low risk that both the primary path and backup path fail if the network device fails. The second priority is associated with a risk higher than that of the first priority in that the risk is present that both the primary path and backup path may fail should either the network device or a shared line card fails. The third priority is associated with a risk that is higher than that of the second and first priorities because the risk of failure of both the primary path and backup path is present should any of a shared packet processor, shared line card or the network device itself fails.

Thus, in the example illustrated in FIG. 2, candidate backup path 212D meets the selection criteria for the first priority because the path does not share a line card or packet processor with the primary path 212A. That is, candidate backup path 212D utilizes line card 204B, packet processor 206C, and port P0 208D. None of these internal routing components are shared with primary path 212A, thus both primary path 212A and candidate backup path 212D will typically fail only if network device 200 fails.

In the example illustrated in FIG. 2, candidate backup path 212C meets the selection criteria for the second priority because while the path shares line card 204A with primary path 212A, candidate backup path 212C utilizes packet processor 206B, which is different from packet processor 206A used by primary path 212A. Thus, both primary path 212A and candidate backup path 212C may fail if either network device 200 or shared line card 204A fails, but candidate backup path 212C will not necessarily fail if packet processor 206A fails.

In the example illustrated in FIG. 2, candidate backup path 212B meets the selection criteria for the third priority because candidate backup path 212B shares line card 204A and packet processor 206A with primary path 212A. Thus, should any of packet processor 206A, line card 204A or network device 200 fail, it is likely that both the primary path 212A and candidate backup path 212B will fail. In this example, primary path 212A and candidate backup path 212B share a line card and packet processor, but have different ports (port P0 208A and P1 208B respectively) associated with the same packet processor.

In this example, an RPD or protocol implementing the techniques described herein selects candidate backup path 212D as the backup path because it is the highest priority candidate backup path. The RPD can program packet processors 206A and 206C with the primary path 212A and backup path 212D respectively. Should an internal routing component along primary path 212A fail, packet processing can be performed via backup path 212D.

In some aspects, the selection of a backup path as disclosed herein may be in response to an event. As an example, network device 200 may select a backup path using the techniques disclosed herein in response to learning a route for another network device via a routing protocol such as Interior Gateway Protocol (IGP). Further, network device 200 may select a backup path in response to the addition of resources such as a new line card or new packet processor.

In some aspects, the techniques to select a backup path as disclosed herein may be enabled or disabled as part of a configuration for network device 200. For example, the network device may enable backup path selection as disclosed herein as a default case, with an option provided for an administrator to disable use of the backup path selection techniques. For example, and administrator may want to avoid loading network device 200 with additional functions and checks. In such cases, the administrator can disable the enhanced backup path selection techniques disclosed herein and network device 200 may revert to conventional backup path selection techniques, or may avoid backup path calculation altogether. In some aspects, there may be two levels of configuration. A first level determines whether link protection or node protection is enabled, and a second level determines if the enhanced backup path selection techniques disclosed herein are used or if other, perhaps conventional, backup path selection techniques are used. Again, the backup selection techniques disclosed herein may be enabled by default if link protection or node protection is enabled for network device 200.

Line cards 204 and packet processors 206 may have identifiers (shown in parentheses in FIG. 2) associated with them. The identifiers may be numeric or alphanumeric identifiers. In some aspects, the identifiers can be unique within network device 200. In some aspects, the identifiers may be unique within a network system 100. In some aspects, packet processors 206 discover the identifiers of line cards 204 and forward the identifiers to an RPD of control unit 201 for use in determining backup paths.

The identifiers may be used to determine if the candidate backup path shares an internal routing component with the primary path. For example, an RPD or protocol can compare the identifiers of internal routing components of the primary path and the backup path. If the identifiers are the same, then the RPD or protocol can determine that the primary path shares the internal routing component with the candidate backup path.

In some aspects, control unit 201 can forward the identifiers to other network devices such as router 202 as part of a link state protocol communication. For example, the identifiers can be advertised to other devices within an Interior Gateway Protocol (IGP) domain. These other network devices can use the identifiers to compute desirable paths between network devices sharing such identifiers. As an example, the identifiers may be advertised in a "constrained shortest path first" (CSPF) algorithm to determine paths between network devices, such as by an ingress network device, a network controller or a path computation engine (PCE). This may be beneficial in network deployments having different vendors or platforms across different network devices.

Figure 3:
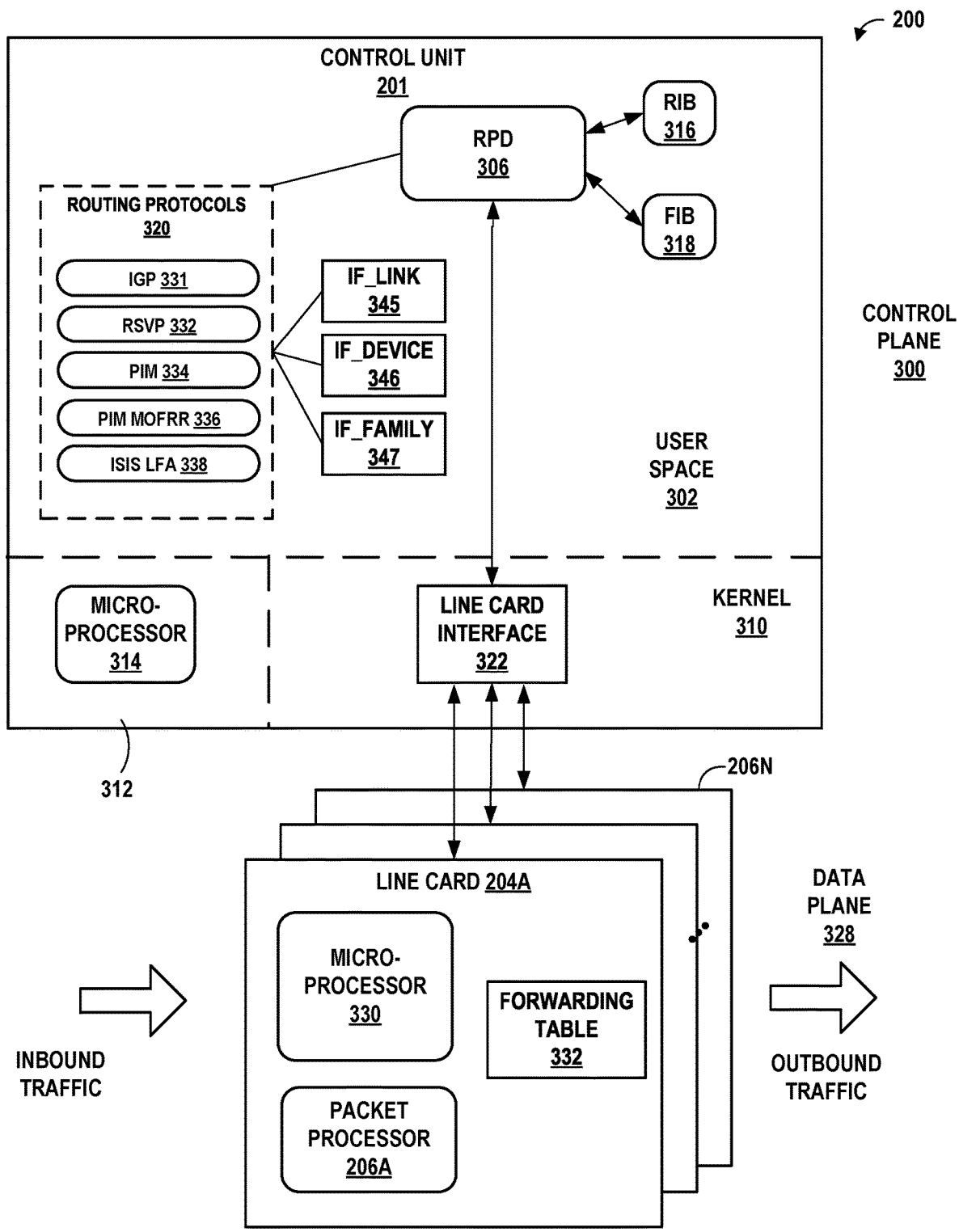
FIG. 3 is a block diagram illustrating an example of the network device of FIGS. 1 and 2 in further detail.

FIG. 3 is a block diagram illustrating an example embodiment of network device 200 of FIG. 2 in further detail. In this example, control unit 201 provides a control plane 300 operating environment for execution of various user-level daemons such as RPD 306 executing in user space 302. Control plane 300 may provide routing plane, service plane, and management plane functionality for network device 200. Various instances of control unit 201 may include additional daemons not shown in FIG. 3 that perform other control, management, or service plane functionality and/or drive and otherwise manage data plane functionality for network device 200.

RPD 316 operates over, and interacts with, kernel 310, which provides a run-time operating environment for user-level processes. Kernel 310 may comprise, for example, a UNIX operating system derivative such as Linux or Berkeley Software Distribution (BSD). Kernel 310 offers libraries and drivers by which RPD 306 may interact with the underlying system. Line card interface 322 of kernel 310 comprises a kernel-level library by which RPD 306 and other user-level processes or user-level libraries may interact with packet processors 206. Line card interface 322 may include, for example, a sockets library for communicating with packet processors 206 over dedicated network links.

Hardware environment 312 of control unit 201 comprises microprocessor 314 that executes program instructions loaded into a main memory (not shown in FIG. 3) from storage (also not shown in FIG. 3) in order to execute the software stack, including both kernel 310 and user space 302 of control unit 201. Microprocessor 314 may comprise one or more general- or special-purpose processors such as a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures, processing circuitry, or any other structure operable to perform techniques described herein.

RPD 306 executes one or more interior and/or exterior routing protocols 320 to exchange routing information with other network devices and store received routing information in routing information base 316 ("RIB 316"). RIB 316 may include information defining a topology of a network, including one or more routing tables and/or link-state databases. RPD 306 resolves the topology defined by routing information in RIB 316 to select or determine one or more active routes through the network and then installs these routes to forwarding information base (FIB) 318. As used here, the information in the RIB 316 used to define each route is referred to as a "routing entry." Typically, RPD 306 generates FIB 318 in the form of a radix or other lookup tree to map packet information (e.g., header information having destination information and/or a label stack) to next hops and ultimately to interface ports of line cards 204 associated with respective packet processors 206.

In some aspects, RPD 306 may implement the techniques described herein to select a backup path from candidate backup paths. In some aspects, a protocol 320 may implement the techniques described herein to select a backup path from candidate backup paths. In some aspects, RPD 306 and a protocol 320 may cooperate to implement techniques described herein to select a backup path from candidate backup paths. In the example shown in FIG. 3, protocols that may implement the techniques described herein include IGP 331, Resource Reservation Protocol (RSVP) 332, Protocol Independent Multicast (PIM) 334, PIM Multicast only Fast ReRoute (MoFRR) 336, and Intermediate System to Intermediate System (ISIS) Loop Free Alternate (LFA) 338. Other protocols not shown in FIG. 3 may also implement the techniques described herein.

Packet processors 206 implement data plane 328 (also known as a "forwarding plane") functionality to handle packet processing from ingress interfaces on which packets are received to egress interfaces (e.g., ports 208, FIG. 2) to which packets are sent. Data plane 328 determines data packet forwarding through network device 200, applies services, rate limits packet flows, filters packets, and otherwise processes the packets using forwarding table 332 installed by control plane 300 to data plane 328. RPD 306 may program a primary path and a backup path in the appropriate forwarding table 332 of a packet processor 206 using line card interface 322 to communicate the primary path and backup path to the packet processor 206A. Line card 204A may include a microprocessor 330 that may execute a microkernel to provide an operating environment for processing packets through packet processor 206.

Each packet processor of packet processors 206 processes packets by performing a series of operations on each packet over respective internal packet forwarding paths as the packets traverse the internal architecture of network device 200. Packet processor 206A, for instance, may include one or more configurable hardware chips (e.g., a chipset) that, when configured by applications executing on control unit 201, define the operations to be performed by packets received by packet processor 206A. Each chipset may in some examples represent a "packet forwarding engine" (PFE). Each chipset may include different chips each having a specialized function, such as queuing, buffering, interfacing, and lookup/packet processing. Each of the chips may represent application specific integrated circuit (ASIC)-based, field programmable gate array (FPGA)-based, or other programmable hardware logic. A single line card may include one or more packet processors 206.

Operations may be performed, for example, on each packet by any of a corresponding ingress interface, packet processor 206, an egress interface or other components of network device 200 to which the packet is directed prior to egress, such as one or more service cards. Packet processors 206 process packets to identify packet properties and perform actions bound to the properties. Each of packet processors 206 includes forwarding path elements that, when executed, cause the packet processor to examine the contents of each packet (or another packet property, e.g., incoming interface) and on that basis make forwarding decisions, apply filters, and/or perform accounting, management, traffic analysis, and load balancing, for example. In one example, each of packet processors 206 arranges forwarding path elements as next hop data that can be chained together as a series of "hops" in a forwarding topology along an internal packet forwarding path for the network device (e.g., a primary path). The result of packet processing determines the manner in which a packet is forwarded or otherwise processed by packet processors 206 from its input interface to, at least in some cases, its output interface (e.g., one of ports 208).

A packet processor 206 can include a lookup data structure (e.g., forwarding table 332) to perform lookup operations, such as a tree (or trie) search, a table (or index) search, a filter determination and application, or a rate limiter determination and application. Lookup operations locate a routing entry that matches packet contents or another property of the packet or packet flow, such as the inbound interface of the packet. The routing entry can be used to determine a port to use to forward a network packet to the next hop.

Line card 204A and/or packet processor 206A can communicate information regarding components of data plane 328 to RPD 306 via line card interface 322. For example, packet processor 206A may communicate Maximum Transmission Unit (MTU), encapsulation type etc. to RPD 306, which can store the information using various conventional data objects such as if link data object 345, if device data object 346, and/or if family data object 347. As noted above, line cards 204 and packet processors 206 may have identifiers (shown in parentheses in FIG. 2) associated with them that can be used to determine if the candidate backup path shares an internal routing component with the primary path. Line cards 204 and/or packet processors 206 can discover the identifiers of line cards 204 and packet processors 206, and can forward the identifiers to an RPD of control unit 201 for use in determining backup paths. In some implementations, if link data object 345, if device data object 346, and/or if family data object 347 may be modified to include the line card identifiers and the packet processor identifiers. Line card 204A and/or packet processor 206A may use interprocess communication facilities such as sockets to communicate information to RPD 306 via line card interface 322.

While FIG. 3 illustrates only line card 204A in detail, each of line cards 204 comprises similar components that perform substantially similar functionality.

Figure 4:
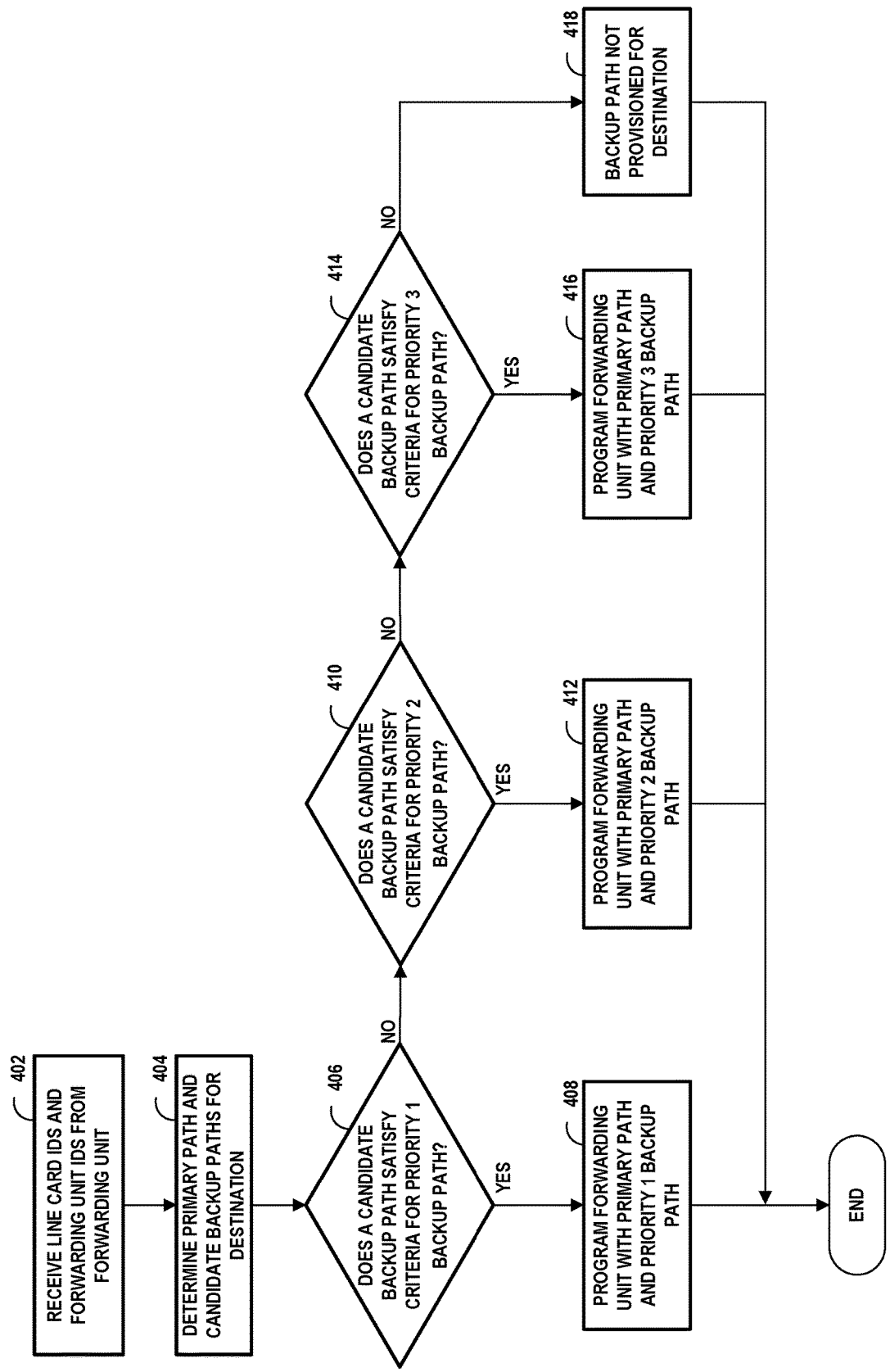
FIG. 4 is a flowchart of an example method to determine backup paths accordance with techniques described in this disclosure.

FIG. 4 is a flowchart of an example method to determine backup paths accordance with aspects of techniques described in this disclosure. An RPD receives line card IDs and packet processor IDs from line cards and/or packet processors on a network devices (402). The RPD or protocol used by the RPD determines a primary path and set of candidate backup paths (404). The RPD determines if there is a candidate backup path in the set of candidate backup paths that satisfies priority one criteria (406). For example, the RPD can compare a line card ID and packet processor ID of a line card and packet processor that are in the primary path with line card IDs and packet processor IDs of line cards and packet processors in the set of candidate backup paths. If there is a candidate backup path that has a line card ID and packet processor ID where both are different from the line card ID and packet processor ID of the primary path, that candidate backup path satisfies the priority one criteria and can be selected as the backup path ("YES" branch of 406). The RPD can program the appropriate packet processors with the primary path and priority one backup path (408).

If no candidate backup path exists that satisfies the priority one criteria ("NO" branch of 406), the RPD can next determine if there is a candidate backup path in the set of candidate backup paths that satisfies the priority two criteria (410). For example, the RPD can compare line a card ID and packet processor ID of a line card and packet processor that are in the primary path with line card IDs and packet processor IDs of line cards and packet processors in the set of candidate backup paths. If there is a candidate backup path that has a line card ID in the primary path that is the same the line card ID in the candidate backup path, but the packet processor IDs of the primary path and backup paths are different, that candidate backup path satisfies the priority two criteria. This candidate backup path can be selected as the backup path ("YES" branch of 410). The RPD can program the appropriate packet processors with the primary path and priority two backup path (412).

If no candidate backup path exists that satisfies the priority one criteria or priority two criteria ("NO" branch of 410), the RPD can next determine if there is a candidate backup path in the set of candidate backup paths that satisfies the priority three criteria (414). For example, the RPD can compare line a card ID and packet processor ID of a line card and packet processor that are in the primary path with line card IDs and packet processor IDs of line cards and packet processors in the set of candidate backup paths. If there is a candidate backup path that has a line card ID and packet processor ID that are the same as those in the primary path, but the port IDs are different, that candidate backup path satisfies the priority three criteria. This candidate backup path can be selected as the backup path ("YES" branch of 414). The RPD can program the appropriate packet processors with the primary path and priority three backup path (416).

If no candidate backup path exists that satisfies the priority one criteria, priority two criteria, or priority three criteria ("NO" branch of 414), the RPD can determine that no backup plan is available to be provisioned for the destination next hop, and allow a backup path for the primary path to remain unprovisioned (418).

In some situations, there may be multiple candidate backup paths that satisfy a given priority criteria. In such cases, network device 200 can use various factors to select one of the backup paths that satisfy the given priority criteria. As an example, network device 200 may select the backup path that has a lowest index number, a backup path that was calculated first, the backup path that uses a line card or packet processor having the lowest (or highest) identifier etc.

As noted above, an administrator may configure a network device to implement link protection or node protection, and may enable or disable backup path selection using the techniques described herein. In some aspects, backup path selection using the techniques described herein is enabled by default when node protection or link protection are selected for a network device. FIGS. 5 and 6 illustrate output of a command line interpreter (CLI) based user interface that displays example configuration output for different use cases of the techniques described herein.

FIG. 5 is a conceptual view of an example user interface output for a network device having an IS-IS LFA interface with a backup path determined according to the techniques described herein. In the example output 500 illustrated in FIG. 5, an administrator or other user has issued a "run show isis interface detail" command. The example output 500 shows configuration details for a loopback interface 502 and two ethernet interfaces, interface 504 and interface 506. As can be seen in the example output, ethernet interface 504 has been configured with link protection. Further, output portion 508 indicates that enhanced backup path selection techniques as described herein are enabled for ethernet interface 504. In this example, the output portion 508 indicates that the enhanced protection is "LC level", indicating that the backup path satisfies the criteria for priority one and the backup path will only fail if the network device fails. Alternatively, an indication of "PFE level" would indicate that the backup path satisfies the criteria for priority two, and both the primary path and backup path may fail if the line card fails. As a further alternative, an indication of "enhanced protection" without a level indicator can indicate that the backup path satisfies the priority three criteria and may fail if the packet processor fails. Interfaces 502 and 506 are not configured for link protection in this example.

FIG. 6 is a conceptual view of an example user interface output for a network device having PIM MoFRR interface with a backup path determined according to the techniques described herein. In the example output 600 illustrated in FIG. 6, an administrator or other user has issued a "run show pim join extensive" command. The example output 600 shows various configuration details for an interface using the PIM protocol. As can be seen in the example output, the interface has been configured with link protection. Further, output portion 602 indicates that enhanced backup path selection techniques as described herein are enabled for the interface. In this example, the output portion 602 indicates that the enhanced protection is "LC level", indicating that the backup path satisfies the criteria for priority one and the backup path will only fail if the network device fails.

Another use case (not shown in the figures) involves the RSVP protocol. RSVP characterizes network nodes (i.e., network devices) as ingress nodes, transit nodes, and egress nodes. In some aspects, the techniques described herein may be implemented on ingress nodes to select bypass label-switched paths (LSPs) and detour LSPs. Similarly, the techniques described herein may be implemented on transit nodes for selecting bypass LSPs.

RSVP may be used in Multi-Protocol Label Switching (MPLS). In MPLS traffic engineering, a Shared Risk Link Group (SRLG) may be defined. An SRLG is a set of links sharing a common resource, which affects all links in the set if the common resource fails. These links share the same risk of failure and are therefore considered to belong to the same SRLG. For example, links sharing a common fiber are said to be in the same SRLG because a fault with the fiber might cause all links in the group to fail.

A link might belong to multiple SRLGs. The SRLG of a path in an LSP is the set of SRLGs for all the links in the path. When computing the secondary path for an LSP, it is preferable to find a path such that the secondary and primary paths do not have any links in common in case the SRLGs for the primary and secondary paths are disjoint. This ensures that a single point of failure on a particular link does not bring down both the primary and secondary paths in the LSP.

When the SRLG is configured, the device uses the Constrained Shortest Path First (CSPF) algorithm and tries to keep the links used for the primary and secondary paths mutually exclusive. If the primary path goes down, the CSPF algorithm computes the secondary path by trying to avoid links that share any SRLG with the primary path. In addition, when computing the path for a bypass LSP, CSPF tries to avoid links that share any SRLG with the protected links. The CSPF algorithm may be modified to use the techniques described herein to compute bypass LSPs where the primary links and secondary links are mutually exclusive and that avoid links that share resources with protected links.

In some aspects, if an administrator has already determined constraints on the selection of backup paths, those constraints will take precedence of backup path selection according to the techniques described herein. For example, and administrator may have configured interface admingroup constraints, Explicit Route Object (ERO) constraints, or Shared Risk Link Group (SRLG) constraints. In such cases, these administrator created constraints may take precedence over selection of backup paths as described herein.

In some aspects, the techniques may be used to automatically determine and configure SRLGs. In current systems, an administrator typically uses manual methods to define an SRLG. The techniques described herein may be used to automatically analyze a network system for shared resources and define SRLGs accordingly.

Figure 7:
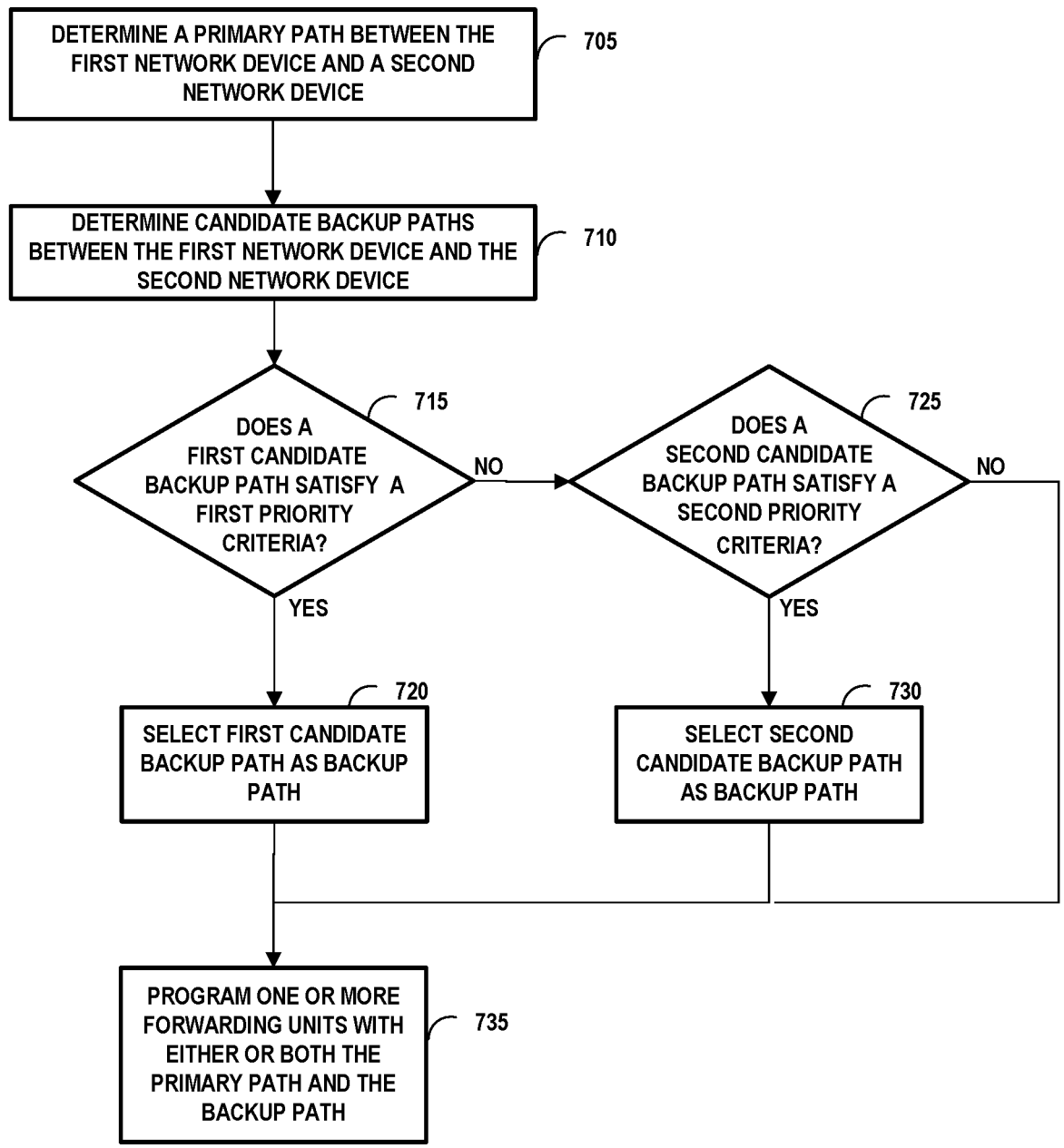
FIG. 7 is a flowchart of another example method to determine backup paths according to the techniques disclosed herein.

FIG. 7 is a flowchart of another example method to determine backup paths according to the techniques disclosed herein. A network device may determine a primary path between the first network device and a second network device (705). Next, a network device may determine a plurality of candidate backup paths between the first network device and the second network device (710). Next, a network device may determine whether a first candidate backup path of the plurality of candidate backup paths satisfies a first priority criteria (715). If the first candidate backup path satisfies the first priority criteria ("YES" branch of 715), the network device may select the first candidate backup path as a backup path for the primary path (720). If the first candidate path does not satisfy the first priority criteria ("NO" branch of 715), the network device may determine whether a second candidate backup path of the plurality of candidate backup paths satisfies a first priority criteria (725). If the second candidate backup path of the plurality of candidate backup paths satisfies the second priority criteria ("YES" branch of 725), the network device may select the second candidate backup path as the backup path for the primary path instead of the first candidate backup path (730). Next, a network device may program one or more packet processors with either or both the primary path and the backup path (735).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combination of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals, carrier waves, or other transient media.

Various examples have been described. These and other examples are within the scope of the following claims.

The invention claimed is:

1. A method comprising:
    determining, by processing circuitry of a first network device, a primary path between the first network device and a second network device;
    determining, by the processing circuitry, a plurality of candidate backup paths between the first network device and the second network device;
    determining, by the processing circuitry, whether a first candidate backup path of the plurality of candidate backup paths satisfies a first priority criteria;
    in response to determining that the first candidate backup path satisfies the first priority criteria, selecting the first candidate backup path as a backup path for the primary path;
    in response to determining that the first candidate backup path does not satisfy the first priority criteria, determining whether a second candidate backup path of the plurality of candidate backup paths satisfies a second priority criteria,
    wherein the first priority criteria and the second priority criteria are based, at least in part, on corresponding risks of simultaneous failure of the primary path and a candidate backup path of the plurality of candidate backup paths,
    in response to determining that the second candidate backup path of the plurality of candidate backup paths satisfies the second priority criteria, selecting the second candidate backup path as the backup path for the primary path instead of the first candidate backup path; and
    programming one or more packet processors of the first network device with either or both the primary path and the backup path.

2. The method of claim 1, wherein the first priority criteria comprise a requirement that the primary path and the candidate backup path are arranged such that they would both fail only when the first network device fails.

3. The method of claim 1, wherein receiving the line card IDs for the plurality of line cards comprises:
    receiving the line card IDs by a routing protocol daemon (RPD) of the first network device.

4. The method of claim 1, further comprising: in response to determining that the second candidate backup path does not satisfy the second priority criteria, allowing a backup path for the primary path to remain unprovisioned.

5. The method of claim 1, further comprising:
    in response to determining that the second candidate backup path does not satisfy the second priority criteria, determining whether a third candidate backup path of the plurality of candidate backup paths satisfies a third priority criteria, wherein the third priority criteria is based, at least in part, on a risk of simultaneous failure of the primary path and a candidate backup path of the plurality of candidate backup paths, in response to determining that the third candidate backup path satisfies the third priority criteria, selecting the third candidate backup path as the backup path for the primary path instead of the first candidate backup path and the second candidate backup path, and in response to determining that the third candidate backup path does not satisfy the third priority criteria, allowing a backup path for the primary path to remain unprovisioned.

6. The method of claim 5, wherein the third priority criteria comprise a requirement that the primary path and the candidate backup path are arranged such that they would both fail when a packet processor shared by the primary path and the candidate backup path fails.

7. The method of claim 6, further comprising:
receiving, by an RPD from one or more packet processors of a plurality of packet processors of the first network device, packet processor identifiers for the plurality of packet processors; and
determining, by the RPD, that the packet processor is shared by the primary path and the candidate backup path when a first packet processor ID for the primary path matches a second packet processor ID for the candidate backup path.

8. The method of claim 1, further comprising:
receiving, by the processing circuitry, packet processor IDs for a plurality of packet processors of the first network device; and
advertising the line card IDs and the packet processor IDs to one or more other network devices in a link state protocol packet.

9. A first network device comprising:
a memory; and
processing circuitry configured to:
determine a primary path between the first network device and a second network device;
determine a plurality of candidate backup paths between the first network device and the second network device;
determine whether a first candidate backup path of the plurality of candidate backup paths satisfies a first priority criteria;
in response to a determination that the first candidate backup path of the plurality of candidate backup paths satisfies the first priority criteria, select the first candidate backup path as a backup path;
in response to a determination that the first candidate backup path does not satisfy the first priority criteria, determine whether a second candidate backup path of the plurality of candidate backup paths satisfies a second priority criteria,
wherein the first priority criteria and the second priority criteria are based, at least in part, on corresponding risks of simultaneous failure of the primary path and a candidate backup path of the plurality of backup paths;
in response to a determination that the second candidate backup path of the plurality of candidate backup paths satisfies the second priority criteria, select the second candidate backup path as the backup path instead of the first candidate backup path; and program one or more packet processors of the first network device with either or both the primary path and the backup path.

10. The first network device of claim 9, wherein the first priority criteria comprise a requirement that the primary path and the candidate backup path are arranged such that they would both fail only when the first network device fails.

11. The first network device of claim 9, wherein the first network device further comprises:
a routing protocol daemon (RPD) configured to receive, from a packet processor of the first network device, the line card IDs.

12. The first network device of claim 9, wherein the processing circuitry is further configured to:
in response to a determination that the second candidate backup path does not satisfy the second priority criteria, allow a backup path for the primary path to remain unprovisioned.

13. The first network device of claim 9, wherein the processing circuitry is further configured to:
in response to a determination that the second candidate backup path does not satisfy the second priority criteria, determine whether a third candidate backup path of the plurality of candidate backup paths satisfies a third priority criteria, wherein the third priority criteria is based, at least in part, on a risk of simultaneous failure of the primary path and a candidate backup path of the plurality of candidate backup paths, in response to a determination that the third candidate backup path of the plurality of candidate backup paths satisfies the third priority criteria, select the third candidate backup path as the backup path instead of the first candidate backup path and the second candidate backup path, and in response to a determination that the third candidate backup path does not satisfy the third priority criteria, allowing a backup path for the primary path to remain unprovisioned.

14. The first network device of claim 13, wherein the third priority criteria comprise a requirement that the primary path and the candidate backup path are arranged such that they would both fail when a packet processor shared by the primary path and the candidate backup path fails.

15. The first network device of claim 14, wherein the processing circuitry is further configured to:
receive, by an RPD from one or more packet processors of a plurality of packet processors of the first network device, packet processor identifiers for the plurality of packet processors; and
determine, by the RPD, that the packet processor is shared by the primary path and the candidate backup path when a first packet processor ID for the primary path matches a second packet processor ID for the candidate backup path.

16. The first network device of claim 9, wherein the processing circuitry is further configured to:
receive packet processor IDs for a plurality of packet processors of the first network device; and
advertise the line card IDs and the packet processor IDs in a link state protocol packet.

17. The first network device of claim 9, wherein the plurality of line cards comprise one or more of a flexible physical interface card (PIC) concentrator (FPC), a dense port concentrator (DPC), or a modular port concentrator (MPC).

18. A computer readable medium comprising instructions that, when executed, cause processing circuitry of a first network device to:

> determine a primary path between the first network device and a second network device;
> 
> determine a plurality of candidate backup paths between the first network device and the second network device;
> 
> determine whether a first candidate backup path of the plurality of candidate backup paths satisfies a first priority criteria;
> 
> in response to a determination that the first candidate backup path of the plurality of candidate backup paths satisfies the first priority criteria, select the first candidate backup path as a backup path;
> 
> in response to a determination that the first candidate backup path does not satisfy the first priority criteria, determine whether a second candidate backup path of the plurality of candidate backup paths satisfies a second priority criteria,
> 
> in response to a determination that the second candidate backup path of the plurality of candidate backup paths satisfies the second priority criteria, select the second candidate backup path as the backup path instead of the first candidate backup path,
> 
> in response to a determination that the second candidate backup path of the plurality of candidate backup paths does not satisfy the second priority criteria, determine whether a third candidate backup path of the plurality of candidate backup paths satisfies a third priority criteria,
> 
> in response to a determination that the third candidate backup path satisfies the third priority criteria, select the third candidate backup path as the backup path,
> 
> wherein the first priority criteria, second priority criteria and the third priority criteria are based, at least in part, on corresponding risks of simultaneous failure of the primary path and a candidate backup path of the plurality of candidate backup paths; and
> 
> program one or more packet processors of the first network device with either or both the primary path and the backup path.

* * * * *